(12) United States Patent
Wang et al.

(10) Patent No.: US 6,588,163 B2
(45) Date of Patent: Jul. 8, 2003

(54) RELIEF ENGRAVED DOORPLATE

(76) Inventors: Martin Wang, No. 90, Zhi Yuan San Road, Taipei (TW); Chi-Sui Wang, No. 12, Lane 1007, Section 1, Zhong Shan Road, Da Jia Town, Taichung (TW); Jui-Shih Lin, No. 405, Lian Tsuen Road, Lian Tsuen Li, Feng Yuan City, Taichung (TW); Tzu Chin Lin, No. 405, Lian Tsuen Road, Lian Tsuen Li, Feng Yuan City, Taichung (TW)

( * ) Notice: Subject to any disclaimer, the term of this patent is extended or adjusted under 35 U.S.C. 154(b) by 21 days.

(21) Appl. No.: 09/906,046

(22) Filed: Jul. 17, 2001

(65) Prior Publication Data

US 2003/0014932 A1 Jan. 23, 2003

(51) Int. Cl.$^7$ ................................................. E04C 2/10
(52) U.S. Cl. ...................... 52/316; 52/309.9; 52/309.14; 52/311.2; 52/445; 428/162; 428/165; 428/171; 428/172; 428/326
(58) Field of Search ............................... 52/316, 309.9, 52/309.14, 311.1, 313, 445, 311.2; 428/167, 170, 171, 326, 168, 161, 162, 165, 172

(56) References Cited

U.S. PATENT DOCUMENTS

| | | | | |
|---|---|---|---|---|
| 2,889,651 A | * | 6/1959 | Baldanza | |
| 3,423,267 A | * | 1/1969 | Munk | |
| 3,797,904 A | * | 3/1974 | Krauth | 312/214 |
| 4,084,996 A | * | 4/1978 | Wheeler | 156/257 |
| 4,769,278 A | * | 9/1988 | Kamimura et al. | 428/282 |
| 4,790,966 A | * | 12/1988 | Sandberg et al. | 264/39 |
| 4,864,790 A | * | 9/1989 | Liardet | 52/311 |
| 4,904,517 A | * | 2/1990 | Lau et al. | 428/167 |
| 5,003,745 A | * | 4/1991 | Fang | 52/316 |
| 5,851,325 A | * | 12/1998 | Terada et al. | 156/62.2 |

* cited by examiner

Primary Examiner—Carl D. Friedman
Assistant Examiner—Yvonne M. Horton
(74) Attorney, Agent, or Firm—Rosenberg, Klein & Lee

(57) ABSTRACT

A type of relief engraved doorplate, comprising an inside plate that is composed of a first Bakelite layer and a second Bakelite layer, said first Bakelite layer and second Bakelite layer being composed of coarse wood dust and fine wood powder respectively, the second Bakelite layer enveloping the exterior of the first Bakelite layer before they are subjected to heated compression molding to obtain the relief engraved pattern on the top and bottom panels of the inside plate; and, at least one pair of outside decorative plates, including at least a layer of thin wood plate and a layer of water-resistant paper, the water-resistant paper being glued onto the thin wood plate and put in a compression mold with a pattern that is opposite to that of the inside plate, to obtain a depressed pattern on one side of the outside decorative plate, which is opposite to the relief engraved pattern on the inside plate, and then it is fitted to the top and bottom panels of the inside plate and subjected to compression molding process to obtain a relief engraved doorplate that has a tightly knit structure and tenacity to resist water and fire.

4 Claims, 6 Drawing Sheets

RELIEF ENGRAVED DOORPLATE

BACKGROUND OF THE INVENTION

1. Field of the Invention

This invention relates to a relief engraved doorplate, particularly to a doorplate construction that is applied to doorplate decoration, having wooden relief engraving and resistance to water and fire.

2. Background of the Invention

Wood is one of the essential materials in our daily life. A wide variety of products in our daily use are made of wood, such as tables, chairs, doorplates, window frames, indoor furniture items, and accessories to wooden buildings. Among them, doorplates have been widely used for the construction of room doors and building entrances. To enhance decorative effects, most doorplates are decorated with exquisite engravings that require many working hours and much labor during the manufacturing process. Due to its failure to meet modern standard for productive efficiency, that kind of doorplate has been abandoned by the industry.

The aforementioned conventional wood-carved doorplates made of logwood involve other problems too. They are not suitable for use in a location with high density of moisture. The wooden doorplates could be corroded and damaged after they are exposed directly and extensively to high humidity at places like sauna houses, swimming pools, bathrooms, etc. Moreover, the engraved doors made of logwood have a low combustion point that may contribute to combustion. In case they are installed substantially in public places such as restaurants or hotels, people may find difficulty to escape or the rescue team may have difficulty trying to rescue the people inside, in case of a fire.

Therefore, there has been the introduction of improved models. Plastic boards are used as the material for the formation of decorative patterns on the doorplate. Using the thermoplastic property of plastics, a decorative pattern similar to wood engraving is formed in advance on the plastic plate material, then it is glued to a wooden doorplate to become the decoration on the surface of the doorplate. Yet, to produce such plastic doorplate with embossed decorative patterns, gluing process could not be started until after the wooden doorplate is finished. That requires two processes of working hours and labor, resulting in increased production costs for the doorplate products. Furthermore, in actual application, with the plastic products glued onto a wooden doorplate, the formed plastic patterns could not present the quality tone as seen on engravings on wooden doors. Meanwhile, plastic doorplates have a low tenacity that could easily be affected by ambient temperature changes, such as heated expansion or cooled shrinkage, and could be deformed or become brittle and easily damaged.

Doorplates made of logwood, as described above, require the consumption of large amounts of timber. The result is huge loss of forest resources and devastating consequences to our environment. Doorplates made of plastics could be produced at low costs, but they are not biodegradable once they are broken and dumped in the yard, resulting in piling of junk garbage and environmental problems.

BRIEF DESCRIPTION OF THE INVENTION

The primary objective of the invention is to provide a type of relief engraved doorplate that has reinforced structural strength and tenacity to resist heated expansion and cooled shrinkage, prevent deformation or damage, and lengthen the service life of the product.

The second objective of the invention is to provide a type of relief engraved doorplate that has extremely tight construction to resist water, humidity and fire, and prevent it from contributing to combustion.

The third objective of the invention is to provide a type of relief engraved doorplate that has a surface displaying superior quality tone with wooden engraved patterns to enhance the value and beauty of the product.

The fourth objective of the invention is to provide a type of relief engraved doorplate that recycles the use of waste materials of coarse wood dust and fine wood powder, for better protection of our environment.

To achieve the above objectives, the invention of relief engraved doorplate comprises an inside plate and at least one pair of outside decorative plates. The inside plate comprises a first Bakelite layer and a second Bakelite layer that are made from coarse wood dust and fine wood powder mixed with glue. The second Bakelite layer tightly enveloping the first Bakelite layer is put in a mold in advance for compression molding, to obtain relief engraved patterns on the top and bottom panels of the inside plate. The outside decorative plate is composed of at least a pair of thin wood plate and water-resistant paper. The water-resistant paper glued to the thin wood plate is put in a mold with a pattern that is opposite to the molding of the inside plate, then subjected to compression molding to obtain a depressed pattern on one side of the outside decorative plate, which is opposite to the relief engraved pattern on the inside plate. Then the plates are mounted onto the top and bottom panels of the inside plate, and subjected to compression molding to tightly combine the inside plates and the outside decorative plates in one unit, to obtain relief engraved patterns on both sides with reinforced structural strength and tenacity to resist water and fire.

BRIEF DESCRIPTION OF DRAWINGS

The drawings of preferred embodiments of this invention are described in following details to enable better understanding.

DETAILED DESCRIPTION OF PREFERRED EMBODIMENTS

Figure 1:
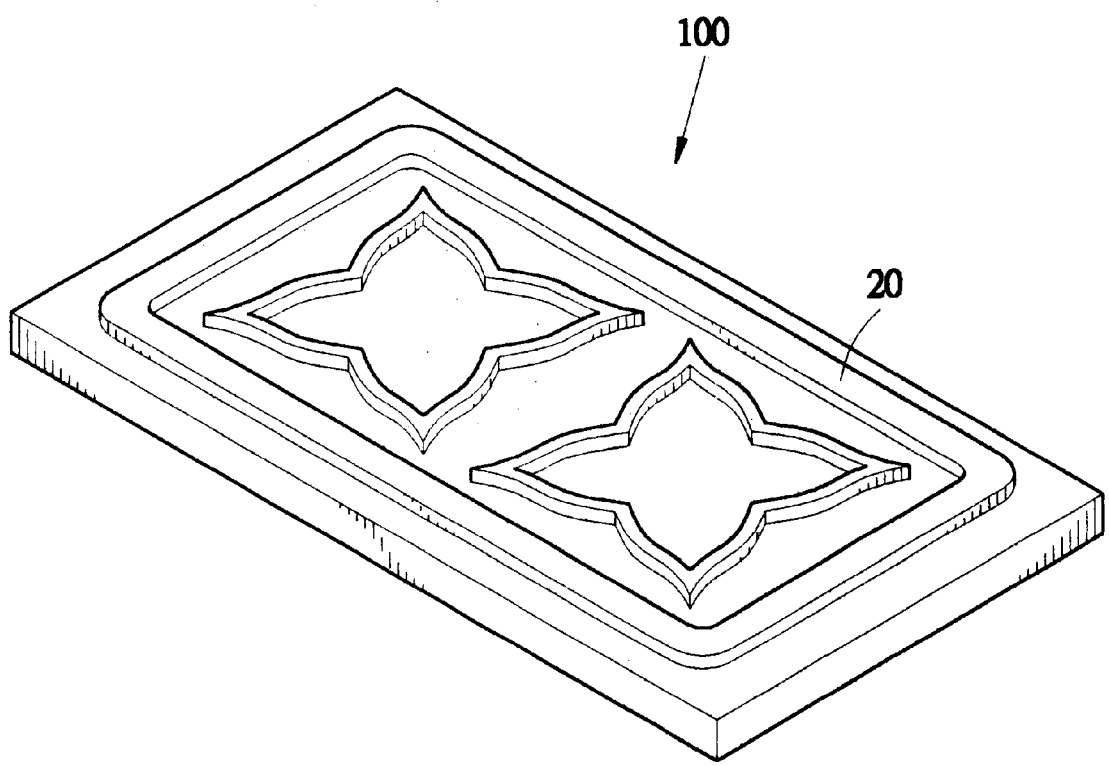
FIG. 1 is a perspective view of the first preferred embodiment of the invention of relief engraved doorplate.
Figure 2:
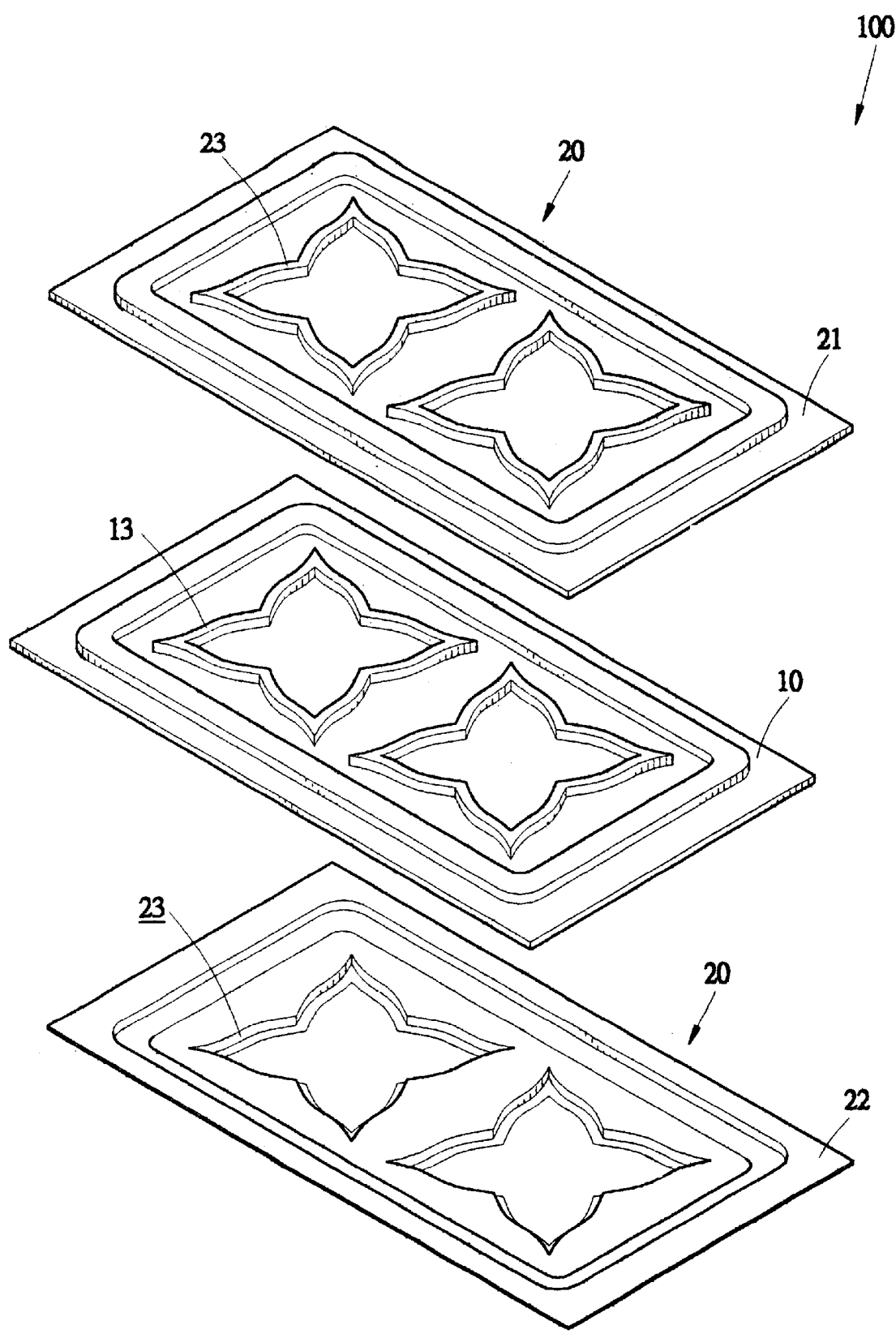
FIG. 2 is a disassembled view of FIG. 1.
Figure 3:
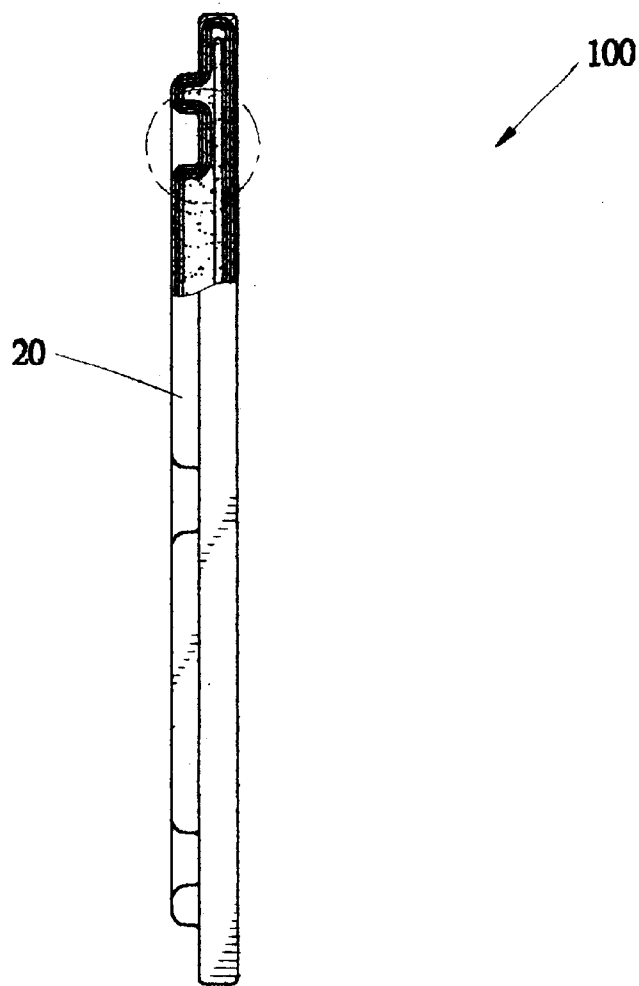
FIG. 3 is a section view of FIG. 1.
Figure 4:
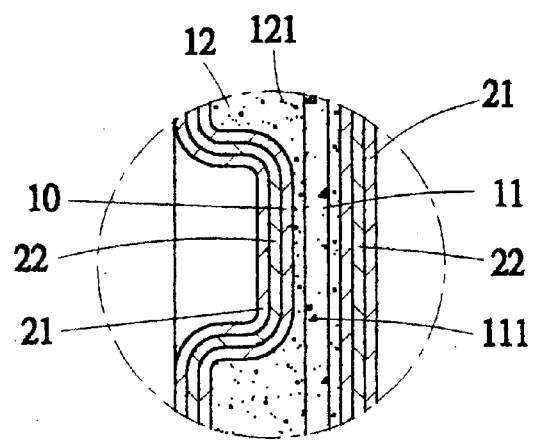
FIG. 4 is a blowup of section view, showing the schematic structure between the first Bakelite layer, the second Bakelite layer, the water-resistant paper and the thin wood plate.

FIGS. 1 through 4 illustrate the subject invention of relief engraved doorplate, which is indicated by the numeral 100 in the following drawings. The relief engraved doorplate 100 comprises an inside plate 10, which is made basically of a first Bakelite layer 11 and a second Bakelite layer 12, which in turn are composed of coarse wood dust 111 and fine wood powder 121 (shown in FIG. 4) mixed with an adhesive compound. The coarse wood dust 111 and fine wood powder 121 are obtained respectively from wastes of corrupted wood blocks or wooden ware that are ground into powder form. The adhesive compound is composed of a mixture of glue with a hardening agent. The second Bakelite layer 12 envelops the exterior of the first Bakelite layer 11 before they are molded in a hot compression mold, so the first Bakelite layer 11 and the second Bakelite layer 12 are tightly bonded, and the top and bottom panels of the inside plate 10 are respectively protruded to form a relief engraved pattern 13 (shown in FIG. 2). This relief engraved pattern 13 is shaped by a previously designed mold.

The invention of relief engraved doorplate 100 further comprises a pair of outside decorative plate 20 that are respectively joined to the top and bottom panels of the inside plate 10, comprising at least a thin wood plate 21 and a layer of water-resistant paper 22. The thin wood plate is a piece shaved off from a natural logwood, having its natural logwood grains. The water-resistant paper 22 is made from paper material that is immersed in an adhesive compound or a dehydrating agent before it is glued to one side of the thin wood plate 21, and then positioned on the opposite side of the inside plate 10 and put inside a mold for hot compression process. The former is formed to have a convex surface, while the later is formed to have a concave surface. They are then compression molded to the effect that one side of the two outside decorative plates 20, the side not glued with the water-resistant paper 22, has a depressed pattern 23 (shown in FIG. 2) to match the relief engraved pattern 13 on the inside plate 10, so it can be fitted correspondingly to the relief engraved pattern 13 on the top and bottom panel of the inside plate 10. Then, they are subjected to secondary compression molding to properly and tightly bind the inside plate 10 and the two outside decorative plates 20 as one unit, and tightly and properly bind the first Bakelite layer 11, the second Bakelite layer 12, the thin wood plate 21 and the water-resistant paper 22 together as one unit.

After the inside plate 10 is bound together with the two outside decorative plates 20 as one unit, the first Bakelite layer 11 containing the coarse wood dust 111 will serve as the primary material. Meanwhile, the second Bakelite layer 12 containing fine wood powder 121 serves to fill in the spaces between the particles of the coarse wood dust of the first Bakelite layer 11, for additional color tone and finish. Therefore, the first Bakelite layer 11 and the second Bakelite layer 12 constitute a tightly knit and interwoven coarse and fine structure to obtain better resistance to pressure and better resistance to direct penetration by water or moisture, and better resistance to fire and water because of its higher combustion point. The water-resistant paper 22 inside the outside decorative plate 20 further enhances the integral resistance to water, and increased the structural tenacity between the first Bakelite layer 11, the second Bakelite layer 12 and the thin wood plate 21, so that the invention of relief engraved doorplate 100 will not become deformed or brittle and subsequent destruction because of environmental effects. Furthermore, the thin wood plate 21 also provides the function of natural logwood grains, so that the surface of the relief engraved doorplate 100 has its three-dimensional decoration of its relief engraved pattern 13, and has the quality tone as found in logwood grains, thus enhancing its beautiful appearance. Of course, the patterns of this thin wood plate 21 can be the combination of a variety of configurations. For instance, in case there are two or more layers of thin wood plate 21 and water-resistant paper 22 (not shown in drawing), one layer can show a longitudinal grain, while the other can show a horizontal grain, so that longitudinal and horizontal grains can be alternatively arranged on the surface of the relief engraved doorplate 100 to display bright and beautiful patterns and decorations.

Figure 5:
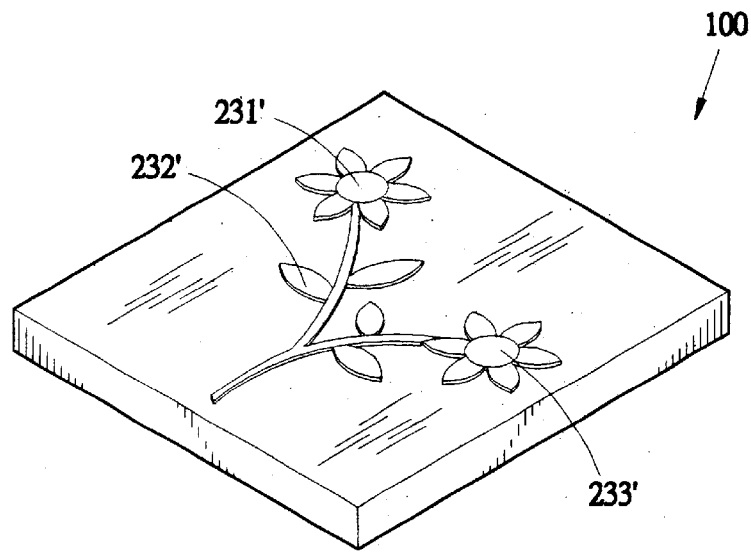
FIG. 5 is a perspective view of the second preferred embodiment of the invention, showing the thin wood plate embedded with patterned inlays to become relief engraved patterns.
Figure 6:
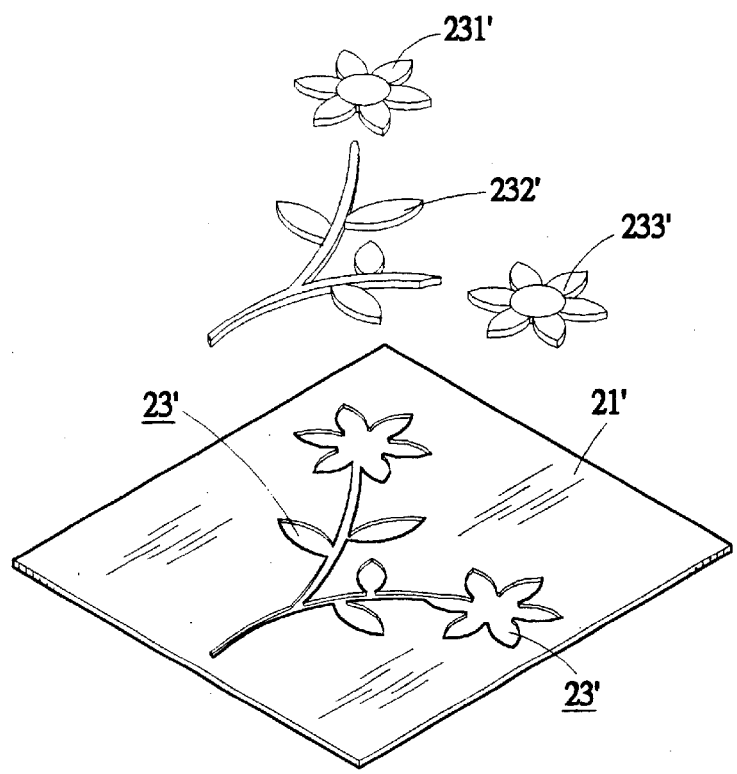
FIG. 6 is a disassembled view of the thin wood plate in FIG. 5.

FIGS. 5 and 6 illustrate the second preferred embodiment of the invention of relief engraved doorplate 100. As shown, the top and bottom panels of the inside plate 10 are flat without having the relief engraved pattern 13. The thin wood plate 21' in the outside decorative plate 20 on the top and bottom panels of the inside plate 10 is embedded with inlays. In other words, on the surface of the thin wood plate 21 has the aforementioned depressed pattern 23', which is the prototype of the desired relief pattern. A plurality of inlays 231', 232' and 233' are sequentially embedded in and assembled to corresponding positions in the depressed pattern 23. The inlays 231', 232' and 233' can be made in different colors or wooden, patterns, so they appear to be relieved when embedded onto the surface of the thin wood plate 21' (shown in FIG. 6). After the thin wood plate 21' is compression molded, along with the first Bakelite layer 11, the second Bakelite layer 12 and the water-resistant paper 22, the surface of the relief engraved doorplate 100 has the quality tone and decorative effects of relieved patterns.

Figure 7:
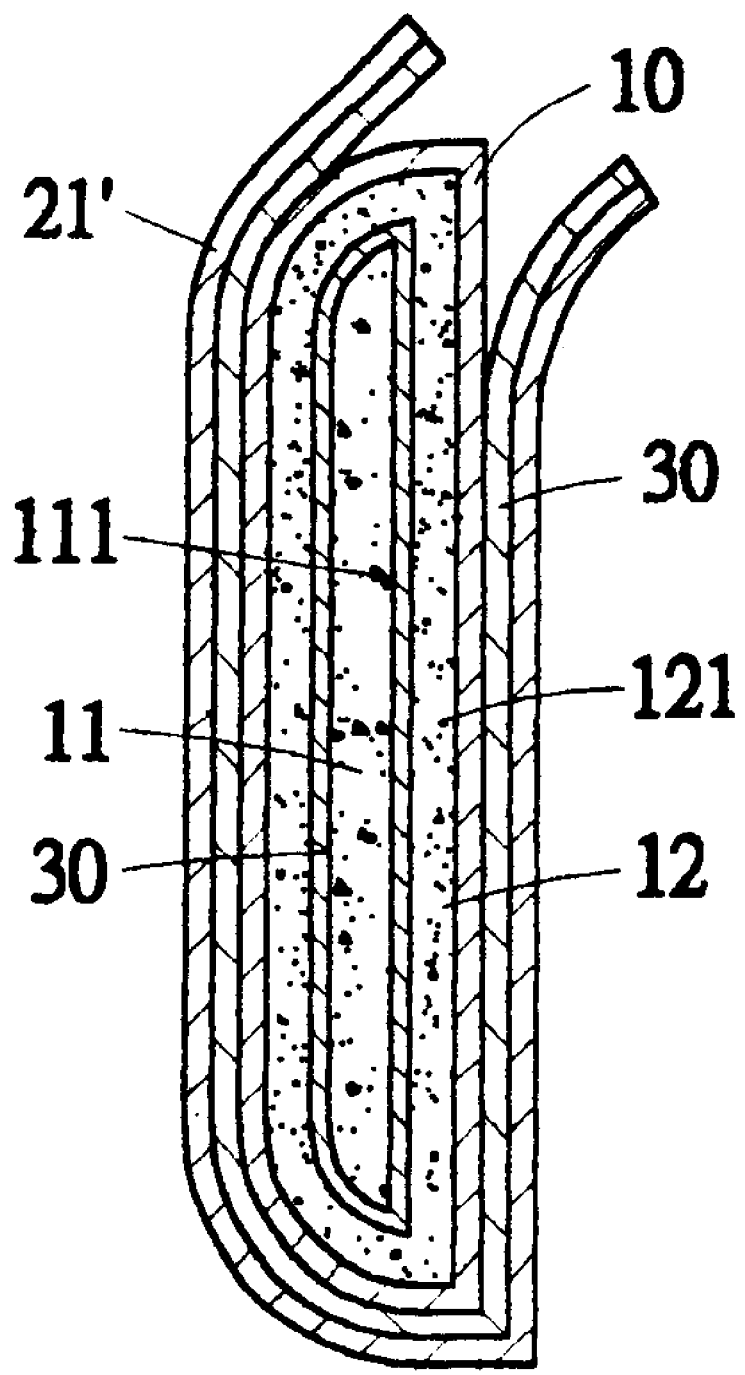
FIG. 7 is a blowup of section view, showing the third preferred embodiment of the invention.

As shown in FIG. 7 that illustrates the third preferred embodiment of the invention of relief engraved doorplate 100, the difference between the first and the second embodiments lies in that, a layer of water-resistant paper 30 is inserted between the first Bakelite layer 11 and the second Bakelite layer 12 of the inside plate 10, to further reinforce the integral structural tenacity and resistance to water of the relief engraved doorplate 100.

Figure 8:
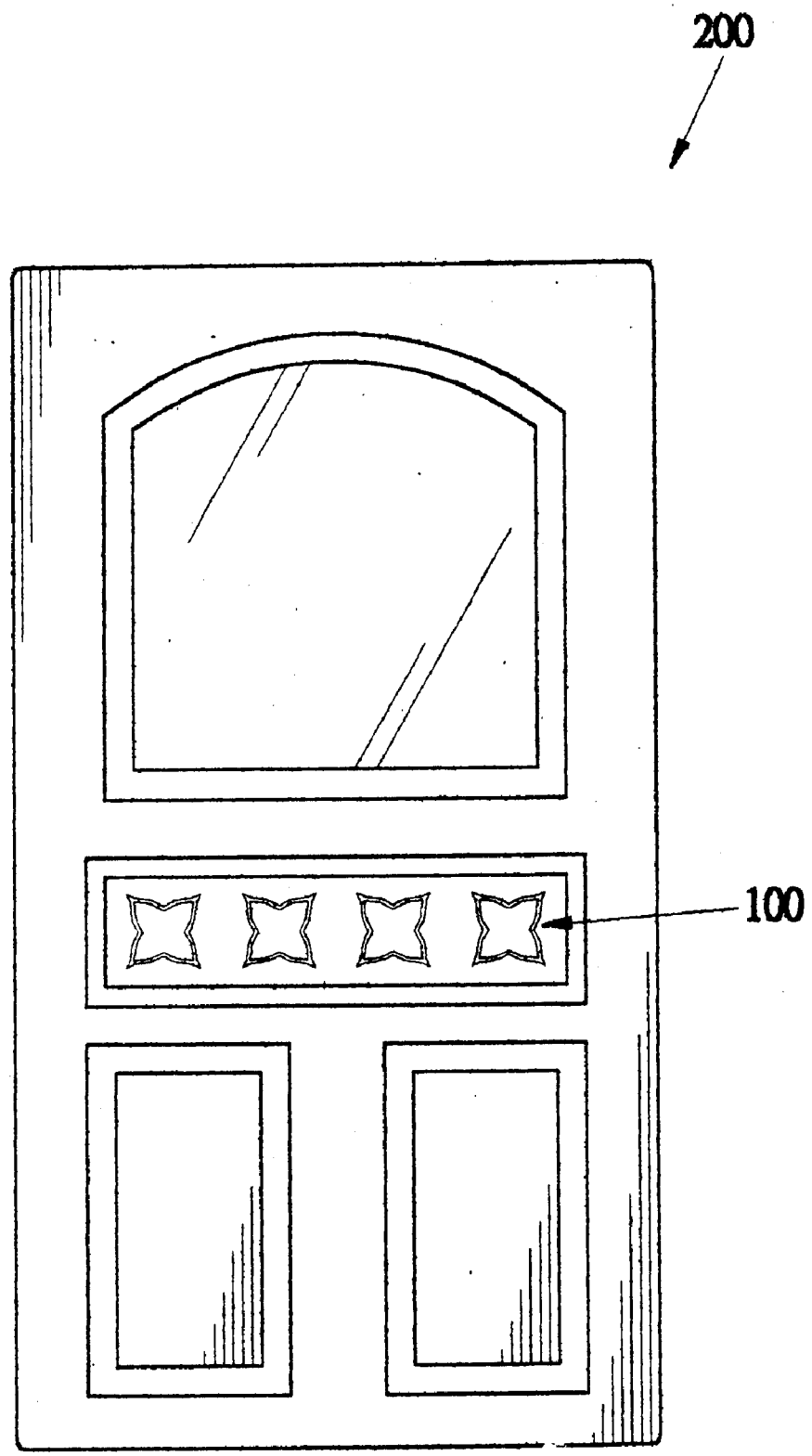
FIG. 8 is a preferred embodiment of the invention when applied to a door.

As shown in FIG. 8, which shows how the invention of relief engraved doorplate 100 as shown in FIGS. 1 through 7 is applied to a door 200. The relief engraved doorplate 100 is fastened to a location where decorative relief engraving is need on the door 200. Of course, it can be assembled with the door 200 as one unit in the manufacture. In other words, it can be mass-produced with the invention assembled with the door 200, instead of the additional process of joining the relief engraved doorplate 100 to the door 200, thus significantly reducing the production cost of the door 200.

To conclude, the integral technical approach and technical conception of the invention of relief engraved doorplate has never been disclosed. The contents and drawings disclosed hereinabove cover only part of preferred embodiments of the invention. Therefore, all equivalent variations and modifications made from the above technical approach shall be included in the spirit and range of the subject claim.

What is claimed is:

1. A relief engraved doorplate, comprising:
   an inside plate having a first layer formed of coarse wood dust mixed with an adhesive compound and a second layer formed of fine wood powder mixed with the adhesive compound, the second layer enveloping an exterior of the first layer, the first and second layers being jointly put in a first compression mold for heated compression thereof to obtain a formation of protruded relief engraved patterns on a top panel surface and a bottom panel surface of the inside plate; and,
   at least one pair of outside decorative plates, each outside decorative plate including at least a thin wood plate and a layer of water-resistant paper, the water-resistant paper being glued onto the thin wood plate in advance, each outside decorative plate being put into a second mold with a pattern that is opposite to a pattern of the first compression mold for the inside plate, to form a depressed pattern that is opposite to the relief engraved pattern on the inside plate, the two outside decorative plates being respectively mounted onto the top and bottom panel surfaces of the inside plate and subjected to heated compression to combine the inside plate and the two outside decorative plates as one unit.

2. A relief engraved doorplate, comprising:

an inside plate having a first layer formed of coarse wood dust mixed with an adhesive compound and a second layer formed of fine wood powder mixed with the adhesive compound, the second layer enveloping an exterior of the first layer and a layer of water-resistant paper being disposed between the first layer and the second layer, the combination of the first and second layers and the water-resistant paper being put in a first compression mold for heated compression thereof to obtain a formation of protruded relief engraved patterns on a top panel surface and a bottom panel surface of the inside plate; and, at least one pair of outside decorative plates, each outside decorative plate including at least a thin wood plate and a layer of water-resistant paper, the water-resistant paper being glued onto the thin wood plate, each outside decorative plate being put into a second mold with a pattern that is opposite to a pattern of the first compression mold for the inside plate, to form a depressed pattern that is opposite to the relief engraved pattern on the inside plate, the two outside decorative plates being respectively mounted onto the top and bottom panel surfaces of the inside plate and subjected to heated compression to combine the inside plate and the two outside decorative plates as one unit.

3. A relief engraved doorplate, comprising:

an inside plate having a first layer formed of coarse wood dust mixed with an adhesive compound and a second layer formed of fine wood powder mixed with the adhesive compound, the second layer enveloping an exterior of the first layer to form a tightly knit structure;

at least one pair of outside decorative plates respectively joined to top and bottom surfaces of the inside plate, each outside decorative plate including at least a thin wood plate and a layer of water-resistant paper, the water-resistant paper being glued onto the thin wood plate in advance, each of the outside decorative plates being subjected to a heated compression molding process to obtain one side with a depressed pattern formation therein; and, a plurality of inlays matching the depressed pattern formation on one side of each outside decorative plate, the plurality of inlays being respectively embedded into said depressed pattern formation of each outside decorative plate, the inside plate and the two outside decorative plates being jointly subjected to a heated compression process to combine the outside decorative plates and the inside plate into one unit, and obtain a relief engraved pattern protruded on a surface of the outside decorative plate on the top and bottom surfaces of the inside plate.

4. The relief engraved doorplate as claimed in claim 3, wherein, there is a layer of water-resistant paper disposed between the first layer and the second layer of the inside plate.

* * * * *